UNITED STATES PATENT OFFICE.

MICHAEL F. COUGHLIN, OF STOUGHTON, MASSACHUSETTS, AND CHARLES E. SWETT, OF PROVIDENCE, RHODE ISLAND, ASSIGNORS TO FREDERIC H. KENNARD, OF NEWTON CENTER, MASSACHUSETTS.

BLEACHED WASTE SULFITE LIQUOR AND PROCESS OF PREPARING SAME.

1,114,120. Specification of Letters Patent. Patented Oct. 20, 1914.

No Drawing. Application filed February 21, 1914. Serial No. 820,274.

*To all whom it may concern:*

Be it known that we, (1) MICHAEL F. COUGHLIN and (2) CHARLES E. SWETT, citizens of the United States, residing at (1) Stoughton and (2) Providence, in the counties of (1) Norfolk and (2) Providence and States of (1) Massachusetts and (2) Rhode Island, have invented certain new and useful Improvements in Bleached Waste Sulfite Liquor and Processes of Preparing Same, of which the following is a specification.

This invention relates to processes of bleaching waste sulfite liquors, and to the bleached product. As is well known, waste sulfite liquor is the dark-brown effluent from the digesters used for the preparation of paper pulp according to the sulfite process.

Our investigations have shown that such liquors may be quite effectively bleached by subjecting them to the reducing action of hydrosulfurous acid, and of its sodium and other salts. Such bleaching is effective either in acid or alkaline solutions. We have also shown that the waste sulfite liquors may be bleached by the simultaneous use of zinc dust and sulfurous acid, or of acid sulfites, reaction being preferably assisted by heat. We have observed however that waste sulfite liquor, when bleached according to any of the foregoing methods, tends to revert, upon exposure to air, to the original dark-brown color, or to some approximation thereto, such reversion being presumably due to a process of oxidation.

We have discovered that a far more permanent decolorization is secured when the waste sulfite liquor is subjected first to a process of oxidation, followed by a reducing treatment, preferably under such conditions as are above described.

In carrying out the process, the proportions of reagents used may vary according to the concentration of the waste liquor; with the ordinary waste product containing approximately ten per cent. of solid matter, the proportions of reagents preferred are approximately as follows:—

To one gallon of sulfite liquor is added one ounce of potassium permanganate dissolved in water, and the mixture is thoroughly stirred. Instead of potassium permanganate, an equivalent quantity of any other oxidizing agent of similar activity, as for example a manganate, chromic acid, a bichromate, or the like, may be used. The mixture is permitted to stand for a longer or shorter time according to its particular character, and is then treated with a solution containing two ounces of commercial hydrosulfite; or two ounces of zinc dust and four ounces of sodium bisulfite may be added. The operation, including both the oxidizing and reducing steps, may be carried out at ordinary temperatures, although we do not confine ourselves to this.

While we prefer to employ hydrosulfites for the reducing treatment, we may substitute therefor other energetic reducing agents. The term "hydrosulfite" is used to include free hydrosulfurous acid, the hydrosulfite-salts of sodium, zinc or other metals, and also the reaction products of zinc and sulfurous acid or acid sulfites.

The oxidizing and reducing agents may of course be mixed directly with the waste sulfite liquor or dissolved therein, instead of being preliminarily dissolved in water. It is to be understood that the proportions in which these reagents are employed may be considerably varied and that the invention is not restricted to the precise proportions specified above as illustrative.

We claim:—

1. As a new product, a bleached waste sulfite liquor, characterized by the presence therein of products derived from the reduction of the constituents of the liquor, and by a comparatively high degree of color stability under exposure to air as compared with products obtained by direct reduction of the waste sulfite liquor.

2. The process of bleaching waste sulfite liquor, which comprises first reacting thereon with an oxidizing agent, and thereafter bleaching the oxidized liquor.

3. The process of bleaching waste sulfite liquor, which comprises first reacting thereon with an oxidizing agent, and thereafter bleaching the oxidized liquor by means of a reducing agent.

4. The process of bleaching waste sulfite liquor, which comprises first reacting thereon with an oxidizing agent, and thereafter bleaching the oxidized liquor by means of a hydrosulfite.

5. The process of bleaching waste sulfite liquor, which comprises first reacting thereon with a permanganate, and thereafter bleaching the oxidized liquor by means of a reducing agent.

6. The process of bleaching waste sulfite liquor, which comprises first reacting thereon with a permanganate, and thereafter bleaching the oxidized liquor by means of a hydrosulfite.

In testimony whereof, we each affix our signatures in presence of two witnesses.

MICHAEL F. COUGHLIN.
CHAS. E. SWETT.

Witnesses as to the signature of Michael F. Coughlin:
HARRY S. MORK,
CARL F. WOODS.

Witnesses as to the signature of Charles E. Swett:
MARY J. RUDDIMAN,
JOHN S. BATES.